US011883697B2

(12) United States Patent
Renault

(10) Patent No.: US 11,883,697 B2
(45) Date of Patent: Jan. 30, 2024

(54) FIRE DETECTION INSIDE A TRANSPORT REFRIGERATION UNIT

(71) Applicant: Carrier Corporation, Palm Beach Gardens, FL (US)

(72) Inventor: Loic Renault, Saint Etienne du Rouvray (FR)

(73) Assignee: CARRIER CORPORATION, Palm Beach Gardens, FL (US)

( * ) Notice: Subject to any disclaimer, the term of this patent is extended or adjusted under 35 U.S.C. 154(b) by 193 days.

(21) Appl. No.: 16/609,957

(22) PCT Filed: May 19, 2017

(86) PCT No.: PCT/IB2017/000838

§ 371 (c)(1),
(2) Date: Oct. 31, 2019

(87) PCT Pub. No.: WO2018/211305

PCT Pub. Date: Nov. 22, 2018

(65) Prior Publication Data

US 2020/0054906 A1 Feb. 20, 2020

(51) Int. Cl.
*A62C 3/07* (2006.01)
*A62C 37/44* (2006.01)
*A62C 3/00* (2006.01)

(52) U.S. Cl.
CPC ................ *A62C 3/07* (2013.01); *A62C 3/004* (2013.01); *A62C 37/44* (2013.01)

(58) Field of Classification Search
CPC ............ A62C 3/004; A62C 3/07; A62C 37/44
See application file for complete search history.

(56) References Cited

U.S. PATENT DOCUMENTS 2,867,281 A 1/1959 Donehue
3,738,428 A 6/1973 Ingro
3,878,898 A 4/1975 Marshall
3,993,138 A * 11/1976 Stevens .................. A62C 37/36 169/61
4,175,677 A 11/1979 Poeschl et al.
(Continued)

FOREIGN PATENT DOCUMENTS

CN 201253435 Y 6/2009
CN 202682613 U 1/2013
(Continued)

OTHER PUBLICATIONS

ISR/WO, dated Jan. 24, 2018, 13 pages total.

*Primary Examiner* — Steven M Cernoch
(74) *Attorney, Agent, or Firm* — CANTOR COLBURN LLP

(57) ABSTRACT

A transport refrigeration unit (TRU) fire detection and mitigation system is provided for use with a TRU that includes a housing and components supportively disposed within the housing that are configured to condition an interior of a container. The TRU fire detection and mitigation system includes a fire detection sub-system and a mitigation sub-system. The fire detection sub-system is partially disposable within the housing and configured to detect a thermal event therein. The mitigation sub-system is coupled to the fire detection sub-system and configured to take a mitigation action responsive to the thermal event being sensed by the fire detection sub-system.

20 Claims, 4 Drawing Sheets

(56) References Cited

U.S. PATENT DOCUMENTS

| | | | | |
|---|---|---|---|---|
| 4,928,255 | A | 5/1990 | Brennecke et al. | |
| 6,161,624 | A * | 12/2000 | Bennett | A62C 35/10 169/58 |
| 6,378,617 | B1 | 4/2002 | Brennan | |
| 7,198,111 | B2 | 4/2007 | Dierker, Jr. et al. | |
| 8,307,934 | B2 | 11/2012 | Rini et al. | |
| 8,590,631 | B2 | 11/2013 | Sprakel et al. | |
| 8,627,841 | B2 | 1/2014 | Hirakata | |
| 8,752,640 | B1 * | 6/2014 | Pottlitzer | A62C 3/002 169/46 |
| 9,399,150 | B1 | 7/2016 | Almutairi | |
| 2006/0278412 | A1 | 12/2006 | Hodges et al. | |
| 2011/0083864 | A1 * | 4/2011 | Smith | A62C 37/48 169/56 |
| 2013/0299203 | A1 | 11/2013 | Turaev | |
| 2015/0075822 | A1 | 3/2015 | Hoke et al. | |
| 2016/0059056 | A1 * | 3/2016 | Hoffman, III | A62C 3/002 169/58 |
| 2017/0312562 | A1 * | 11/2017 | Chopko | A62C 99/0045 |

FOREIGN PATENT DOCUMENTS

| | | | |
|---|---|---|---|
| CN | 102698387 | B | 8/2014 |
| CN | 104258525 | A | 1/2015 |
| CN | 104353203 | A | 2/2015 |
| CN | 204170317 | U | 2/2015 |
| CN | 205073555 | U | 3/2016 |
| CN | 205235217 | U | 5/2016 |
| CN | 206063591 | U | 4/2017 |
| DE | 102005027718 | A1 | 11/2006 |
| EP | 2308567 | A2 | 4/2011 |
| EP | 2543415 | A1 | 1/2013 |
| NL | 7315348 | A | 5/1975 |
| WO | 2015099620 | A1 | 7/2015 |
| WO | 2016060868 | A1 | 4/2016 |

* cited by examiner

FIRE DETECTION INSIDE A TRANSPORT REFRIGERATION UNIT

CROSS-REFERENCE TO RELATED APPLICATIONS

This application claims the benefit of PCT/IB2017/000838 filed May 19, 2017, which is incorporated herein by reference in its entirety.

BACKGROUND

The following description relates to transport refrigeration units and, more particularly, to a system and method for fire detection inside a transport refrigeration unit (TRU).

TRUs that are operated with natural gas and other similar fuels can produce high temperature exhaust fluids from combustion and gas conversion operations. Thus, the occurrence of a fire is a risk which is associated with certain TRU operations. Therefore, regulations have been propagated which require that vehicles on which TRUs are deployed be equipped with an alarm system capable of fire and smoke detection and that such alarm system be operational whenever the vehicle is operated and be capable of alerting a driver or operator through an acoustic or visual alert.

BRIEF DESCRIPTION

According to one aspect of the disclosure, a transport refrigeration unit (TRU) fire detection and mitigation system is provided for use with a TRU that includes a housing and components supportively disposed within the housing that are configured to condition an interior of a container. The TRU fire detection and mitigation system includes a fire detection sub-system and a mitigation sub-system. The fire detection sub-system is partially disposable within the housing and configured to detect a thermal event therein. The mitigation sub-system is coupled to the fire detection sub-system and configured to take a mitigation action responsive to the thermal event being sensed by the fire detection sub-system.

In accordance with additional or alternative embodiments, the container is a container of a transportation vehicle.

In accordance with additional or alternative embodiments, the housing includes a ceiling to which respective components of the fire detection and mitigation sub-systems are secured.

In accordance with additional or alternative embodiments, the components include an exhaust system, a clutch, a gas supply hose and gas containers, the housing includes potential hot spot locations proximal to each of the components and at least respective portions of the fire detection and mitigation sub-systems are disposable proximate to the potential hot spot locations.

In accordance with additional or alternative embodiments, the fire detection sub-system includes a loop disposable within the housing with a nominal pressure which is increasable responsive to a thermal event within the housing and a switch which is actuatable by an increased pressured in the loop to activate the mitigation sub-system.

In accordance with additional or alternative embodiments, the loop includes piping charged with gas.

In accordance with additional or alternative embodiments, the loop has a serpentine configuration.

In accordance with additional or alternative embodiments, the switch includes at least one of a pressure activated switch and an electromagnetic switch.

In accordance with additional or alternative embodiments, the mitigation sub-system includes at least one of a safety controller and an extinguishing system.

In accordance with additional or alternative embodiments, the mitigation action includes at least one of a modification of gas flow to the components of the TRU by the safety controller, an issuance of an alert by the safety controller and an activation of the extinguishing system.

In accordance with additional or alternative embodiments, the extinguishing system includes a tank configured to store fire extinguishing material, one or more nozzles configured to spray the fire extinguishing material outwardly, piping by which the one or more nozzles are fluidly coupled to the tank and a controllable valve fluidly interposed between the tank and the piping. The controllable valve is normally closed and selectively opened to permit a flow of the fire extinguishing material from the tank to the one or more nozzles.

According to another aspect of the disclosure, a transport refrigeration unit (TRU) fire detection and mitigation system is provided for use with a TRU that includes a housing and components supportively disposed within the housing that are configured to condition an interior of a container of a transportation vehicle. The TRU fire detection and mitigation system includes a fire detection sub-system and a mitigation sub-system coupled to the fire detection sub-system. The fire detection sub-system includes a loop disposable within the housing with a nominal pressure which is increasable responsive to a thermal event within the housing and a switch which is actuatable by an increased pressured in the loop to activate the mitigation sub-system. The mitigation sub-system is configured to take a mitigation action responsive to activation by the switch.

In accordance with additional or alternative embodiments, the housing includes a ceiling to which respective components of the fire detection and mitigation sub-systems are secured.

In accordance with additional or alternative embodiments, the components include an exhaust system, a clutch, a gas supply hose and gas containers, the housing includes potential hot spot locations proximal to each of the components and at least respective portions of the fire detection and mitigation sub-systems are disposable proximate to the potential hot spot locations.

In accordance with additional or alternative embodiments, the loop includes piping charged with gas.

In accordance with additional or alternative embodiments, the loop has a serpentine configuration.

In accordance with additional or alternative embodiments, the switch includes at least one of a pressure activated switch and an electromagnetic switch.

In accordance with additional or alternative embodiments, the mitigation sub-system includes at least one of a safety controller and an extinguishing system.

In accordance with additional or alternative embodiments, the mitigation action includes at least one of a modification of gas flow to the components of the TRU by the safety controller, an issuance of an alert by the safety controller and an activation of the extinguishing system.

In accordance with additional or alternative embodiments, the extinguishing system includes a tank configured to store fire extinguishing material, one or more nozzles configured to spray the fire extinguishing material outwardly, piping by which the one or more nozzles are fluidly coupled to the tank and a controllable valve fluidly interposed between the tank and the piping. The controllable valve is normally closed and selectively opened to permit a flow of the fire extinguishing material from the tank to the one or more nozzles.

According to yet another aspect of the disclosure, a method of operating a transport refrigeration unit (TRU) fire detection and mitigation system is provided. The method includes housing components of the TRU in a housing, operating the components to condition an interior of a container, detecting a thermal event relative to one or more of the components within the housing and taking a mitigation action in response to the detecting of the thermal event.

In accordance with additional or alternative embodiments, the detecting includes responding to an increased pressure of a loop disposed within the housing and the taking of the mitigation action includes at least one of modifying gas flow to the components, issuing an alert and activating an extinguishing system.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

DETAILED DESCRIPTION

As will be described below, components of fire detection and mitigation systems are installed inside a TRU engine room. The fire detection system includes a loop, which is charged with gas and which is affixed to a cover or ceiling of the TRU engine room proximate to one or more hot spots therein, and a switch. In a case of a thermal event inside the TRU engine room, a pressure of the gas charged in the loop increases and this pressure increase is registered by the switch. The mitigation system includes a safety controller and an extinguishing system. When the switch registers the pressure increase in the loop, the switch activates the mitigation system to take a mitigation action is taken. This mitigation action can include one or more of cutting off gas flow to the TRU by the safety controller, issuing an alert by the safety controller and an activation of the extinguishing system.

Figure 1:
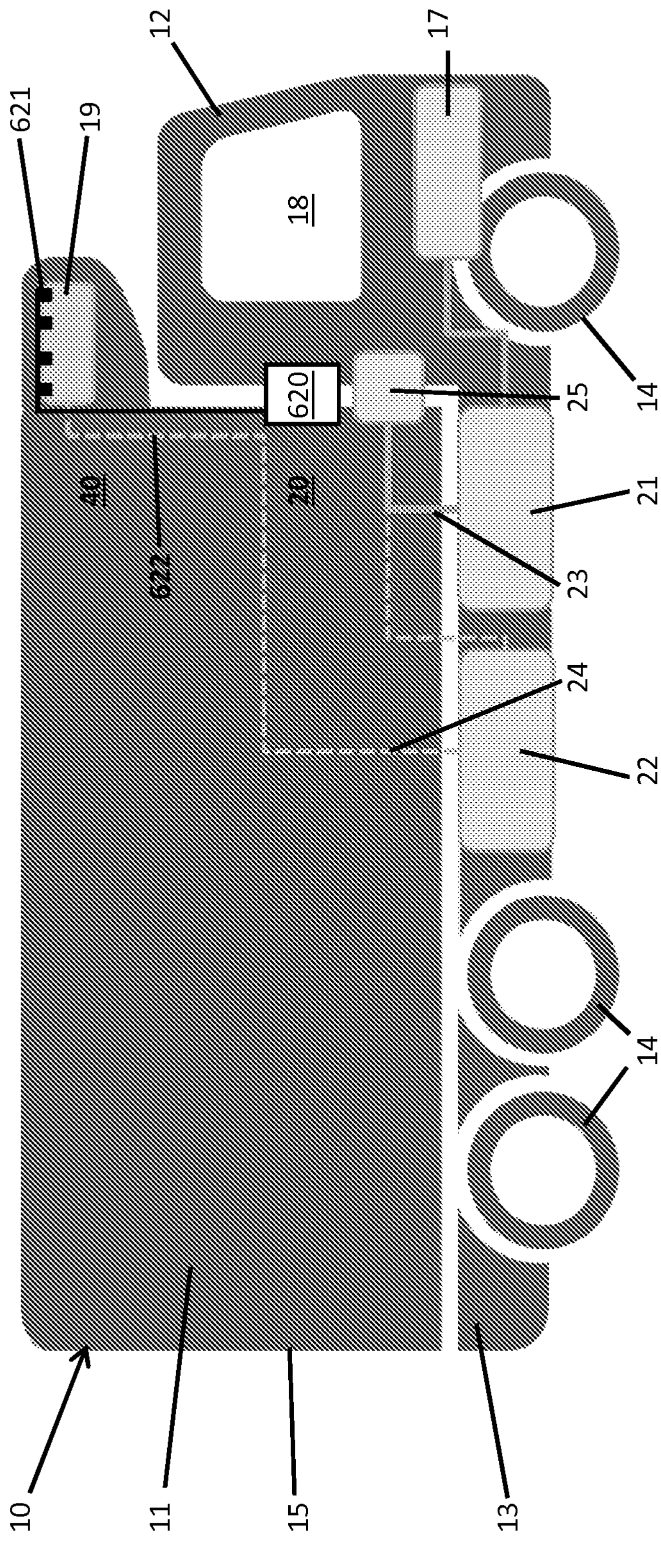
FIG. 1 is a side view of a trucking vehicle in accordance with embodiments.
Figure 2:
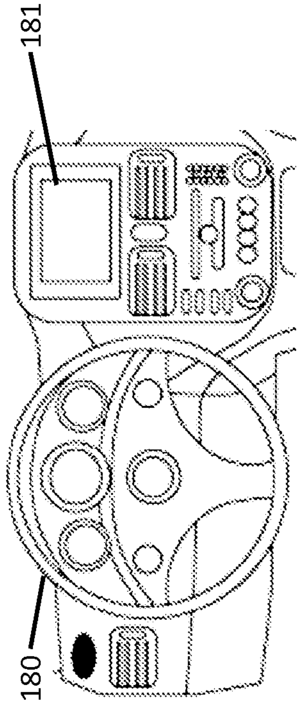
FIG. 2 is a front view of a portion of a dashboard that could be deployed in the trucking vehicle of FIG. 1.
Figure 3:
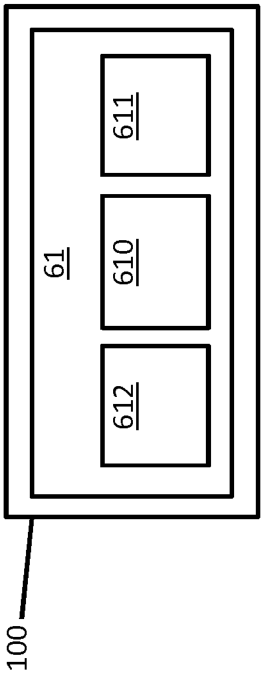
FIG. 3 is a schematic diagram of a processor that could be deployed in the trucking vehicle of FIG. 1.

With reference to FIGS. 1-3, a vehicle 10 is provided. The vehicle 10 includes a vehicle body 11 having a cab 12, a bed 13 rearwardly extended from the cab 12, wheels 14 that are arrayed beneath the cab 12 and the bed 13 and a container 15 that is supportively disposed on the bed 13. Thus, the vehicle 10 may be configured, for example, as a trucking vehicle although it is to be understood that other embodiments exist and that the use of the trucking vehicle as the example is only done for clarity and brevity.

The vehicle 10 further includes a gas engine 17, a cabin 18 and a TRU 19. The gas engine 17 may be provided as a diesel engine and is housed in the cab 12. The gas engine 17 is configured to burn gas to generate power by which movements of the vehicle body 11 can be driven. The cabin 18 is also housed in the cab 12 and is formed to accommodate at least a driver as well as vehicle control elements, such as a steering wheel 180 and a user interface device 181 (see FIG. 2), for controlling at least the gas engine 17, the movements of the vehicle body 11 and operations of the TRU 19 and a vehicle controller 100 (see FIG. 3). The TRU 19 is configured to burn gas, such as natural gas, to generate power by which an interior of a compartment of the container 15 is conditioned.

The vehicle 10 further includes a TRU system architecture 20. The TRU system architecture 20 includes a first gas tank 21, which is supportable on the vehicle body 11 and, more particularly, on the bed 13 proximate to the cab 12, and a second gas tank 22, which is supportable on the vehicle body 11 and, more particularly, on the bed 13. The first tank 21 is disposed to store gas for use in the gas engine 17 and the second tank 22 is disposed to store gas for use in the TRU 19.

The TRU system architecture 20 further includes first piping 23, second piping 24 and a common gas filling point 25. The first piping 23 extends through the vehicle body 11 and is fluidly coupled at a first end thereof to the common gas filling point 25 and at a second end thereof to the first tank 21. The second piping 24 extends through the vehicle body 11 and is fluidly coupled at a first end thereof to the common gas filling point 25 and at a second end thereof to the second tank 22. As such, while the first tank 21 receives gas directly from the first piping 23 and the second tank 22 receives gas directly from the second piping 24, the first tank 21 and the second tank 22 are both gas-filled by way of the common gas filling point 25. The common gas filling point 25 is defined on a portion of the vehicle body 11 and is fluidly coupled to the first and second piping 23 and 24.

With continued reference to FIG. 1 and with additional reference to FIGS. 4, 5, 6A and 6B, the vehicle 10 further includes a TRU fire detection and mitigation system 40. The TRU fire detection and mitigation system 40 is provided for use with the TRU 19 of FIG. 1 in particular to the extent that the TRU 19 includes a housing 190 and components 191 that are supportively disposed within an "engine room" of the housing 190 and configured to condition the interior of the compartment of the container 15. The fire detection and mitigation system 40 includes a fire detection sub-system 50 and a mitigation sub-system 60, which is coupled to the fire detection sub-system 50. The fire detection sub-system 50 is partially disposable within the housing 190 and is configured to detect a thermal event, such as a fire, within the housing 190 and in the TRU 19. The mitigation sub-system 60 is configured to take a mitigation action in response to the thermal event being sensed by the fire detection sub-system 50.

Figure 4:
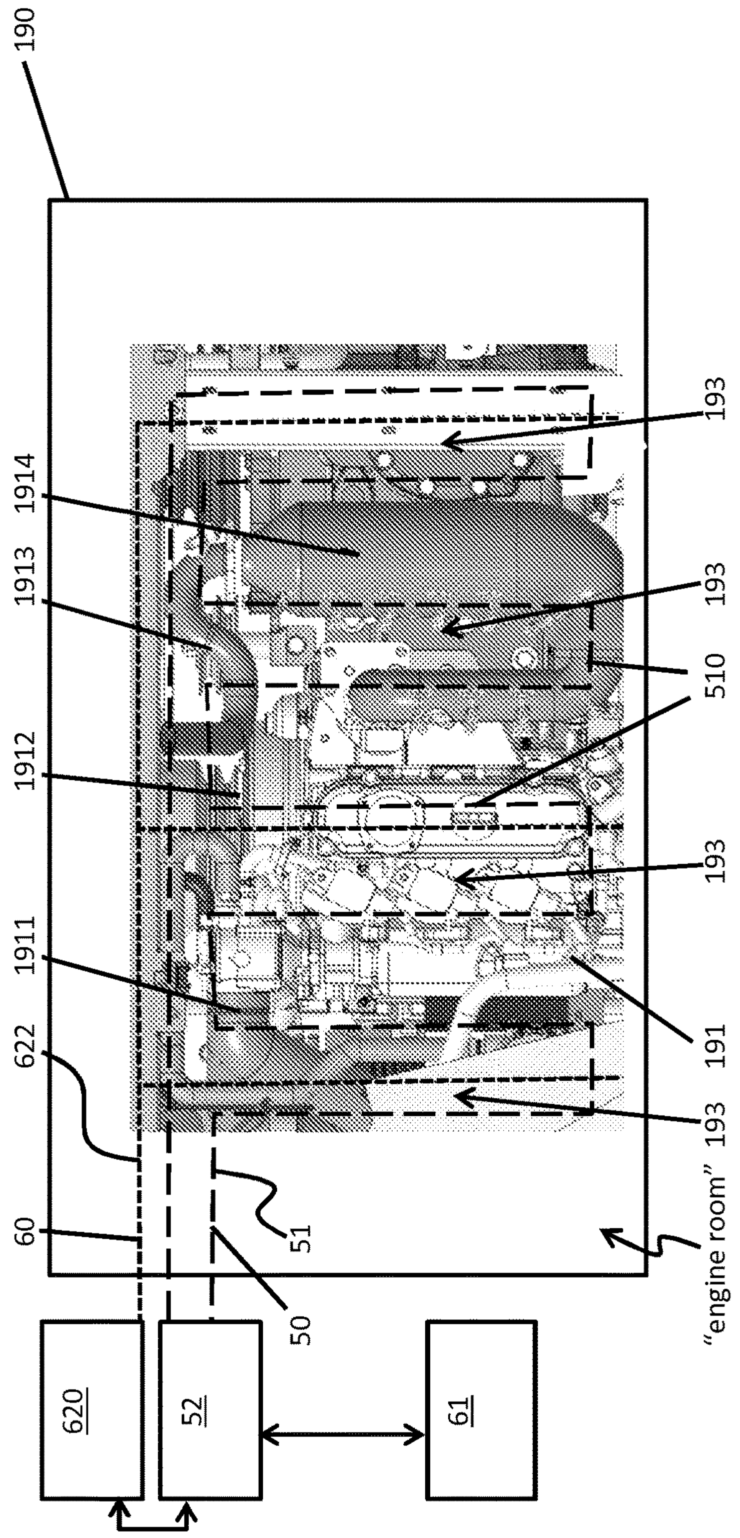
FIG. 4 is a top-down view of components of fire detection and mitigation sub-systems of a transport refrigeration unit (TRU) fire detection and mitigation system in accordance with embodiments.
Figure 5:
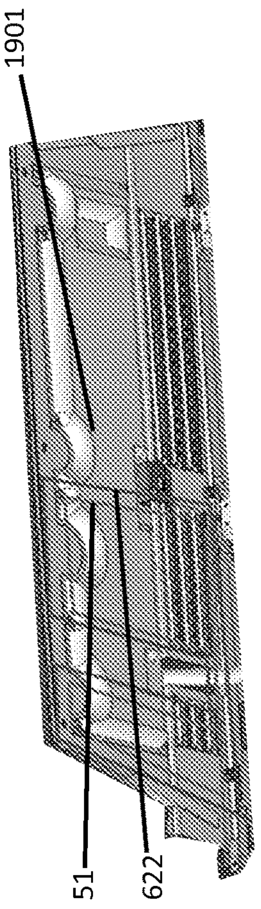
FIG. 5 is a perspective view of the components of the fire detection and mitigation sub-systems of the TRU fire detection and mitigation system of FIG. 4.

As shown in FIGS. 4 and 5, the housing 190 includes a ceiling 1901 that may be formed of sheet metal or another similar material. In accordance with embodiments, respective components of the fire detection and mitigation sub-systems 50 and 60 may be secured to the ceiling 1901. In addition, the components 191 may include an exhaust system 1911, a clutch 1912, a gas supply hose 1913 and gas containers 1914 such that the housing 190 includes potential hot spot locations 193. These potential hot spot locations 193 are defined as being those locations within the engine room of the housing 190 at which an occurrence of the thermal event is most likely and are generally proximate to each of the components 191. At least respective portions of the fire detection and mitigation sub-systems 50 and 60 are disposable proximate to the potential hot spot locations 193.

Figure 6A:
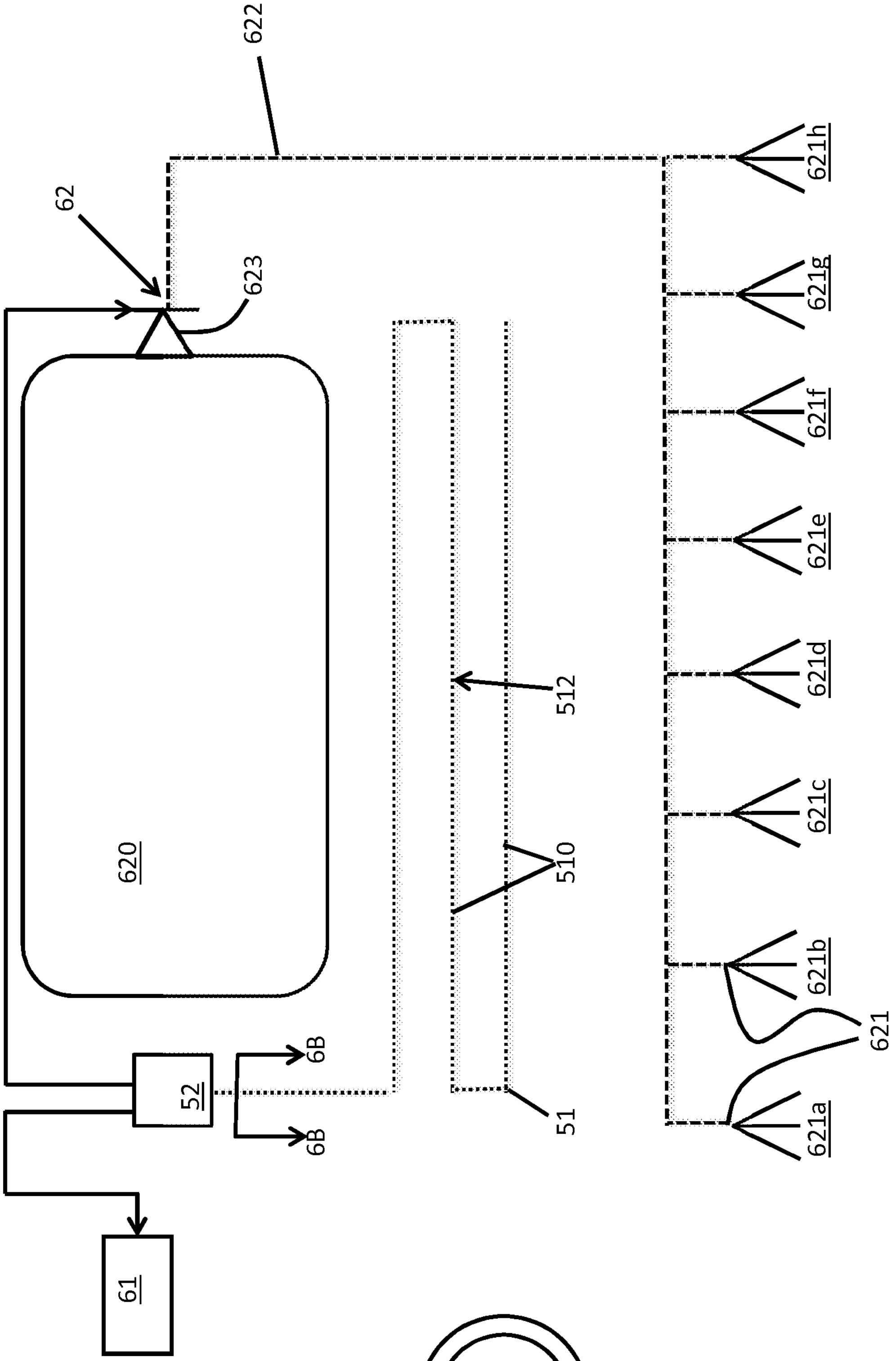
FIG. 6A is a schematic illustration of the fire detection and mitigation sub-systems of the TRU fire detection and mitigation system of FIGS. 4 and 5.
Figure 6B:
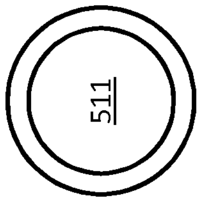
FIG. 6B is a cross-sectional view of piping of the fire detection sub-system taken along line 6B-6B of FIG. 6A.

As shown in FIGS. 6A and 6B, the fire detection sub-system 50 may include a loop 51 and a switch 52, which may include or be provided as one of a pressure activated switch and an electromagnetic switch. The loop 51 is disposable within the housing 190 with a nominal interior pressure. This nominal interior pressure is increasable in response to the thermal event within the housing 190. The loop 51 is coupled to the switch 52 such that the switch 52 is actuatable by an increased pressured in the loop 51 to activate the mitigation sub-system 60. In accordance with embodiments, the loop 51 may include or be provided as loop piping 510 that is securable to the ceiling 1901 (see FIG. 5) of the housing 190. In addition, the loop 51 may be formed to define an interior 511 (see FIG. 6B) that can be charged with gas or fluid and may be provided with a serpentine configuration 512 such that the loop 51 covers or snakes through at least the potential hot spot locations 193 as shown in FIG. 4.

As shown in FIGS. 4 and 5, the serpentine configuration 512 may be formed such that the loop 51 includes multiple hairpin turns that are positioned proximate to corresponding ones of the potential hot spot locations 193. The positioning of these turns allows the loop 51 to quickly react to the thermal event wherever such thermal event actually occurs.

As shown in FIG. 6A, the mitigation sub-system 60 includes at least one of a safety controller 61 which is disposed in signal communication with the switch 52 and an extinguishing system 62. The safety controller 61 may be provided as a component of the vehicle controller 100 of FIG. 3 or as a stand-alone feature. In either case, the safety controller 61 may include a processor 610, a memory unit 611 and an input/output (I/O) unit 612 (see FIG. 3).

The memory unit 611 may have executable instructions stored thereon, which, when executed, cause the processor 610 to operate as described herein by way of the I/O unit 612. For example, where the mitigation sub-system 60 includes the safety controller 61, the mitigation action may include at least one or both of a modification of gas flow to the components 191 of the TRU 19 by the processor 610 of the safety controller 61 by way of the I/O unit 612 and corresponding valves of at least the first piping 23 of FIG. 1. Such gas flow modification may include a shut off or a drastically reduced gas flow to the components 191. As another example, where the mitigation sub-system 60 includes the safety controller 61, the mitigation action may include an issuance of an alert by the processor 610 of the safety controller 61 by way of the I/O unit 612 and the user interface device 181 of FIG. 2 or another similar feature of the vehicle 10. Where the mitigation sub-system 60 includes the extinguishing system 62, the mitigation action may be an automatic or manual and electromagnetic or hydraulic activation of the extinguishing system 62 by way of the safety controller 61 and/or the switch 52.

As shown in FIGS. 1 and 6A, the extinguishing system 62 includes a tank 620, one or more nozzles 621, tank-nozzle piping 622 and a controllable valve 623. The tank 620 is configured to store fire extinguishing material in an interior thereof. The one or more nozzles 621 are distributed throughout the housing 190 and are configured to spray the fire extinguishing material outwardly towards the components 191. The tank-nozzle piping 622 fluidly couples the one or more nozzles 621 to the tank 620 and may be securable to the ceiling 1901 of the housing 190. The controllable valve 623 is fluidly interposed between the tank 620 and the tank-nozzle piping 622 and may be coupled to at least one or both of the switch 52 and the safety controller 61. The controllable valve 623 is normally closed and selectively opened by either the switch 52 and/or the safety controller 61 to permit a flow of the fire extinguishing material from the tank 620 to the one or more nozzles 621.

As shown in FIGS. 4 and 5, the tank-nozzle piping 622 may be formed to include multiple wings that are positioned proximate to corresponding ones of the potential hot spot locations 193. The positioning of these wings and their corresponding nozzles 621 allows the extinguishing system 62 to reliably spray extinguishing material over a given thermal event in some part of the housing 190.

In accordance with further embodiments, the fire detection and mitigation sub-systems 50 and 60 may include further sub-assemblies that are independently controllable from one another. For example, the fire detection sub-system 50 may be configured to identify a specific location of a thermal event. Meanwhile, at least the nozzles 621*a* and 621*b* may be positioned in and around the potential hot spot 193 which is defined proximate to the exhaust system 1911 and may be used to spray fire extinguishing material independently from nozzles 621*c-h*. Here, in an event that the fire detection sub-system 50 is identifies that the thermal event is occurring and determines that it is only occurring locally in the exhaust system 1911 proximate to the nozzles 621*a* and 621*b*, the mitigation sub-system 60 may be activated such that only nozzles 621*a* and 621*b* spray the fire extinguishing material.

Figure 7:
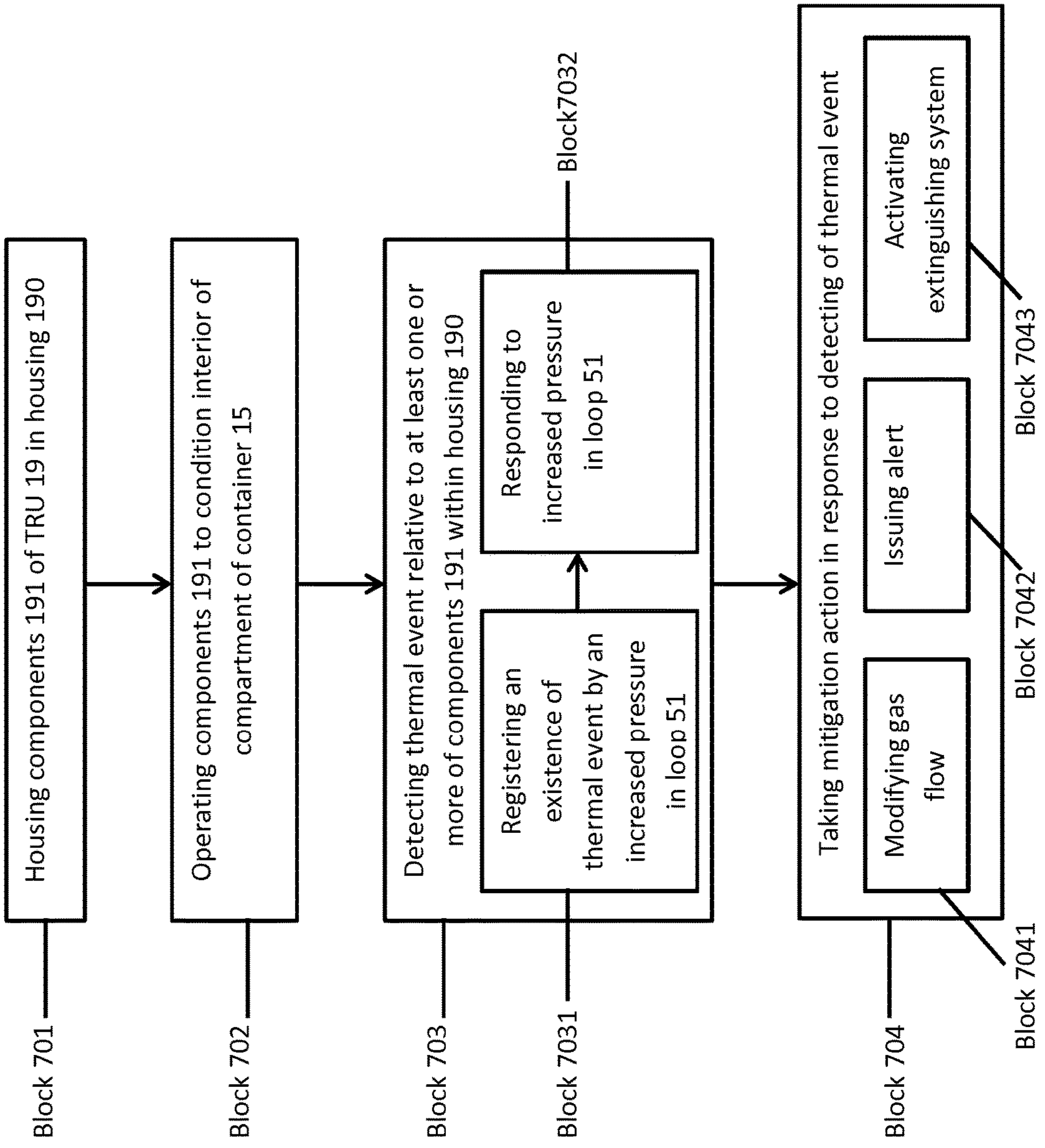
FIG. 7 is a flow diagram illustrating a method of operating a TRU fire detection and mitigation system in accordance with embodiments.

With reference to FIG. 7, a method of operating the TRU fire detection and mitigation system 40 is provided and includes housing the components 191 of the TRU 19 in the housing 190 (block 701), operating the components 191 to condition the interior of the compartment of the container 15 (block 702), detecting the thermal event relative to at least one or more of the components 191 within the housing 190 (block 703) and taking a mitigation action in response to the detecting of the thermal event (block 704). In accordance with embodiments, the detecting of block 703 may include registering an existing of the thermal event by an increased pressure in the loop 51 (block 7031) and responding to the increased pressure in the loop 51 (block 7032) and the taking of the mitigation action of block 704 may include at least one of modifying gas flow to the components 191 (block 7041), issuing the alert (block 7042) and activating the extinguishing system 62 (block 7043).

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A transport refrigeration unit (TRU), comprising:

a housing;

components supportively disposed in the housing and configured to condition an interior of a container; and a fire detection and mitigation system comprising:

a fire detection sub-system which is partially disposable within the housing and configured to detect a thermal event therein; and a mitigation sub-system coupled to the fire detection sub-system and configured to take a mitigation action responsive to the thermal event being sensed by the fire detection sub-system, wherein:

the fire detection sub-system comprises a loop within the housing with a nominal pressure which is increasable responsive to a thermal event within the housing and a switch which is actuatable by an increased pressure in the loop to activate the mitigation sub-system and the loop comprises piping charged with gas that begins and terminates at the switch and follows a serpentine configuration with multiple hairpin turns, and the mitigation sub-system comprises a safety controller and the mitigation action comprises a modification of gas flow to the components by the safety controller.

2. The TRU according to claim 1, wherein the container comprises a container of a transportation vehicle.

3. The TRU according to claim 1, wherein the housing comprises a ceiling to which respective components of the fire detection and mitigation sub-systems are secured.

4. The TRU according to claim 1, wherein:

the components comprise an exhaust system, a clutch, a gas supply hose and gas containers, the housing comprises hot spot locations proximal to each of the components, and each of the multiple hairpin turns of the piping of the loop of the fire detection sub-system is disposed proximate to a corresponding one of the hot spot locations.

5. The TRU according to claim 1, wherein:

the multiple hairpin turns of the serpentine configuration are arranged in series in a side-by-side formation, and each of the multiple hairpin turns of the serpentine configuration is characterized as having a short piping section interposed at opposite right angles between long piping sections.

6. The TRU according to claim 1, wherein the switch comprises at least one of a pressure activated switch and an electromagnetic switch.

7. The TRU according to claim 1, wherein the mitigation sub-system comprises the safety controller and an extinguishing system.

8. The TRU according to claim 7, wherein the mitigation action comprises:

a shutting off of gas flow to the components of the TRU by the safety controller.

9. The TRU according to claim 7, wherein the extinguishing system comprises:

a tank configured to store fire extinguishing material;

one or more nozzles configured to spray the fire extinguishing material outwardly;

piping by which the one or more nozzles are fluidly coupled to the tank; and a controllable valve fluidly interposed between the tank and the piping, the controllable valve being normally closed and selectively opened to permit a flow of the fire extinguishing material from the tank to the one or more nozzles.

10. A transport refrigeration unit (TRU) fire detection and mitigation system, comprising:

a fire detection sub-system; and a mitigation sub-system coupled to the fire detection sub-system, the fire detection sub-system comprising a loop disposable within a housing of a TRU with a nominal pressure which is increasable responsive to a thermal event within the housing and a switch which is actuatable by an increased pressure in the loop to activate the mitigation sub-system, and the mitigation sub-system being configured to take a mitigation action responsive to activation by the switch and the loop comprises piping charged with gas that begins and terminates at the switch and follows a serpentine configuration with multiple hairpin turns, and the mitigation sub-system comprises a safety controller and the mitigation action comprises a modification of gas flow to TRU components by the safety controller.

11. The TRU fire detection and mitigation system according to claim 10, wherein the housing comprises a ceiling to which respective components of the fire detection and mitigation sub-systems are secured.

12. The TRU fire detection and mitigation system according to claim 10, wherein:

the TRU comprises components supportively disposed within the housing and configured to condition an interior of a container of a transportation vehicle, the components comprise an exhaust system, a clutch, a gas supply hose and gas containers, the housing comprises hot spot locations proximal to each of the components, and each of the multiple hairpin turns of the piping of the loop of the fire detection sub-system is disposed proximate to a corresponding one of the hot spot locations.

13. The TRU fire detection and mitigation system according to claim 10, wherein:

the multiple hairpin turns of the serpentine configuration are arranged in series in a side-by-side formation, and each of the multiple hairpin turns of the serpentine configuration is characterized as having a short piping section interposed at opposite right angles between long piping sections.

14. The TRU fire detection and mitigation system according to claim 10, wherein the switch comprises at least one of a pressure activated switch and an electromagnetic switch.

15. The TRU fire detection and mitigation system according to claim 10, wherein the mitigation sub-system comprises the safety controller and an extinguishing system.

16. The TRU fire detection and mitigation system according to claim 15, wherein the mitigation action comprises:

a shutting off of gas flow by the safety controller.

17. The TRU fire detection and mitigation system according to claim 15, wherein the extinguishing system comprises:

a tank configured to store fire extinguishing material;

one or more nozzles configured to spray the fire extinguishing material outwardly;

piping by which the one or more nozzles are fluidly coupled to the tank; and a controllable valve fluidly interposed between the tank and the piping, the controllable valve being normally closed and selectively opened to permit a flow of the fire extinguishing material from the tank to the one or more nozzles.

18. A transport refrigeration unit (TRU), comprising:

a housing in which components are disposed and configured to condition a container interior, the housing comprising hot spot locations proximal to each component; and a detection system configured to detect a thermal event in the housing; and a mitigation system coupled to the detection system and configured to take a mitigation action responsive to the thermal event being sensed by the detection system, the detection system comprising a loop within the housing with a nominal pressure which is increasable responsive to the thermal event and a switch which is actuatable by an increased pressure in the loop to activate the mitigation system, and the loop comprising gas-charged piping beginning and terminating at the switch and following a serpentine configuration with multiple hairpin turns proximate to the hot spot locations, wherein the mitigation system comprises a safety controller and the mitigation action comprises a shutting off of gas flow to the components by the safety controller.

19. The TRU according to claim 18, wherein:

the hot spot locations are arrayed remote from one another along a length of the housing, and each of the multiple hairpin turns is proximate to a corresponding one of the hot spot locations.

20. The TRU according to claim 19, wherein:

the multiple hairpin turns of the serpentine configuration are arranged in series in a side-by-side formation, and each of the multiple hairpin turns of the serpentine configuration is characterized as having a short piping section interposed at opposite right angles between long piping sections.

* * * * *